United States Patent Office 2,822,369
Patented Feb. 4, 1958

2,822,369

ESTERS OF 9,12-DIKETOSTEARIC ACID, 9,12-DIKETO-10,11-OCTADECENOIC ACID, AND 9,12-DIKETO-10,11-EPOXYSTEARIC ACID

Joseph Nichols, Princeton, and Edgar S. Schipper, New Brunswick, N. J., assignors to Ethicon, Inc., a corporation of New Jersey No Drawing. Application May 5, 1955
Serial No. 506,356

7 Claims. (Cl. 260—348)

This invention relates to esters of 9,12-diketostearic acid, 9,12-diketo-10,11-octadecenoic acid, and 9,12-diketo-10,11-epoxystearic acid, and more particularly relates to dialkylaminoalkyl esters thereof.

U. S. Patent No. 2,623,889, December 30, 1952, discloses the oxidation of 12-ketooleic acid and 12-ketoelaidic acid and esters of the acids with chromic acid to produce a diketooctadecenoic acid, having an empirical formula of $C_{18}H_{30}O_4$ and a melting point of 112° C. to 113° C. The oxidation was carried out by means of excess chromic acid over that required to oxidize a methylene group in the molecule, approximately 400 percent excess being preferred for the best yields. The solvent medium was glacial acetic acid in an amount in excess of that required for a single phase reaction medium and excess free sulfuric acid was also present in an amount of at least about three times as much as required to form chromic acid from the soluble dichromate present in the reaction mixture. It was originally believed that the carbon-carbon double bond in the diketooctadecenoic acid prepared by the oxidation was in the 9,10 position, but it has been since shown that the position of the carbon double bond is 10,11. 9,12-diketo-10,11-epoxystearic acid and 9,12-diketo-10,11-dihydroxystearic acid may be prepared by the oxidation of 9,12-diketo-10,11-octadecenoic acid with hydrogen peroxide. Oxidation with hydrogen peroxide leading to the production of 9,12-diketo-10,11-epoxystearic acid is conducted in an alkaline medium at a low temperature and is preferably conducted at a temperature not above —5° C. in the presence of magnesium chloride which acts as a catalyst. Oxidation with hydrogen peroxide leading to the production of 9,12-diketo-10,11-dihydroxystearic acid is conducted in a neutral or slightly acidic medium and preferably at a temperature not exceeding 70° C. in the presence of a catalytic amount of osmium tetroxide.

The novel esters of this invention may be prepared by reacting equi-molar amounts of the acid and a lower alkyl chloroformate such as isobutylchloroformate, ethylchloroformate or propylchloroformate in the presence of an equi-molar amount of a lower aliphatic tertiary amine, an acylalkylcarbonate resulting from the reaction. The reaction is conducted at a temperature below 0° C. and in the presence of an inert solvent such as tetrahydrofuran or toluene. The addition of about one to two moles of an alcohol and about one mole of a tertiary amine to the reaction mixture containing the acylalkylcarbonate results in the formation of the desired ester.

The novel esters may also be prepared by the interaction of the silver salt of the acid with a chloroalkylamine.

The novel esters of this invention have the following general structure:

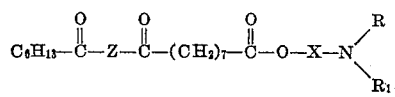

in which Z is an ethylene, vinylene, or epoxyethylene radical, X is a lower alkyl straight, or branched-chain radical and preferably having two or three carbon atoms; and each of R and $R_1$ is a lower alkyl radical and preferably an ethyl or methyl radical.

For the purpose of illustration, the following examples are set forth to illustrate the preparation of the novel compounds of the invention but are not to be construed as limiting the spirit of the invention or its scope.

EXAMPLE I

Beta-dimethylaminoethyl-9,12-diketo-10,11-epoxystearate 4.11 grams of isobutylchloroformate were added dropwise to a stirred solution of 9.78 grams of 9,12-diketo-10,11-epoxystearic acid and 3.06 grams of triethylamine in 500 ml. of tetrahydrofuran, the temperature during the addition being maintained at —5° to —10° C. The reaction mixture was maintained at a temperature of —5° to —10° C. and stirred for thirty minutes. A hot solution of 5.4 grams of dimethylaminoethanol and 3.06 grams of triethylamine in 50 ml. of tetrahydrofuran was added to the stirred reaction mixture and after addition was complete the reaction mixture was heated and refluxed for thirty minutes. The solvent was removed under reduced pressure and the residue was suspended in 500 ml. of 3-normal-hydrochloric acid. The acidified suspension was treated with animal charcoal and filtered. The filtrate was neutralized at 0° C. with a ten percent aqueous solution of potassium hydroxide. The oily layer which formed on neutralization was extracted with two 250 ml. portions of ether, the ether layers were combined, washed with water and dried over sodium sulfate. The drying agent was removed by filtration and the filtrate was evaporated to dryness under reduced pressure. The solid residue obtained upon evaporation of the filtrate was recrystallized three times from ether, the crystals being formed at —40° C. 0.2 grams of beta-dimethylaminoethyl - 9,12 - diketo - 10,11 - epoxystearate were obtained.

Calculated for $C_{22}H_{39}O_5N$: Carbon=66.46%; hydrogen=9.89%. Found: Carbon=66.35%; hydrogen=10.02%.

EXAMPLE II

Beta-dimethylaminoethyl-9,12-diketostearate 4.11 grams of isobutylchloroformate were added dropwise to a stirred solution of 9.36 grams of 9,12-diketostearic acid and 3.06 grams of triethylamine in 300 ml. of tetrahydrofuran, the temperature during the addition being maintained at —5° C. to —10° C. The reaction mixture was maintained at a temperature of —5° to —10° C. and stirred for thirty minutes. A hot solution of 5.4 grams of dimethylaminoethanol and 3.06 grams of triethylamine in 25 ml. of toluene was added to the stirred reaction mixture and after addition was complete the mixture was refluxed for thirty minutes. The solvent was removed under reduced pressure and the residue was suspended in 500 ml. of 3-normal-hydrochloric acid. The acidified suspension was treated with animal charcoal and filtered. The filtrate was neutralized at 0° C. with a ten percent solution of potassium hydroxide. The oily layer which formed on neutralization was extracted with two 250 ml. portions of ether, the ether layers were combined, washed with water and dried over sodium sulfate. The drying agent was removed by filtration and the filtrate was evaporated to dryness under reduced pressure. The solid residue obtained upon evaporation of the filtrate was recrystallized three times from ether, crystals being formed at —30° C. 1.5 grams of beta-dimethylaminoethyl-9,12-diketostearate having a melting point of 36°–37° C. were obtained.

Calculated for $C_{22}H_{41}O_4N$: Carbon=68.89%; hydrogen=10.77%. Found: Carbon=68.96%; hydrogen=10.75%.

EXAMPLE III

*Beta - diethylaminoethyl - 9,12 - diketo - 10,11 - epoxystearate*

4.11 grams of isobutylchloroformate were added dropwise to a stirred solution of 9.78 grams of 9,12-diketo-10,11-epoxystearic acid and 3.06 grams of triethylamine in 500 ml. of methylenechloride, the temperature during the addition being maintained at −5° C. to −10° C. The reaction mixture was maintained at a temperature of −5° C. to −10° C. and stirred for thirty minutes. A hot solution of 7.05 grams of diethylaminoethanol and 3.06 grams of triethylamine in 10 ml. of methylene chloride was added to the stirred reaction mixture and after addition was complete the mixture was refluxed for thirty minutes. The solvent was removed under reduced pressure and the residue was suspended in 500 ml. of 3-normal-hydrochloric acid. The anhydride of 9,12-diketo-10,11-epoxystearic acid was removed by filtration and the filtrate was treated with animal charcoal and then neutralized at 0° C. with a ten percent solution of potassium hydroxide. The oily layer which formed on neutralization was extracted with two 250 ml. portions of ether, the ether layers were combined, washed with water and dried over sodium sulfate. The sodium sulfate was removed by filtration and the filtrate was evaporated to dryness under reduced pressure. The solid residue obtained by evaporation to dryness was crystallized from a solvent containing equal parts by weight of ether and petroleum ether (B. P. 30°–60° C.), crystals being formed at −20° C. 0.6 gram of beta-diethylaminoethyl-9,12-diketo-10,11-epoxystearate having a melting point of 45° C. were obtained.

Calculated for $C_{24}H_{43}O_5N$: Carbon=67.73%; hydrogen=10.18%. Found: Carbon=68.37%; hydrogen=10.33%.

EXAMPLE IV

*Beta - diethylaminoethyl - 9,12 - diketo - 10,11 - octadecenoate*

4.11 grams of isobutylchloroformate were added dropwise to a stirred solution of 9.3 grams of 9,12-diketo-10,11-octadecenoic acid and 3.06 grams of triethylamine in 300 ml. of methylene chloride, the temperature being maintained at −5° to −10° C. The reaction mixture was maintained at a temperature of −5° to −10° C. and stirred for thirty minutes. A hot solution of 7.05 grams of diethylaminoethanol and 3.06 grams of triethylamine in 10 ml. of methylene chloride was added to the stirred reaction mixture and after addition was complete the mixture was refluxed for thirty minutes. The solvent was removed under reduced pressure and the residue was suspended in 300 ml. of 3-normal-hydrochloric acid. The anhydride of 9,12-diketo-10,11-octadecenoic acid which formed was removed by filtration and the filtrate was treated with animal charcoal and then neutralized at 0° C. with a ten percent solution of potassium hydroxide. The oily layer which formed was extracted with two 250 ml. portions of ether, the ether layers were combined, washed with water, and dried over sodium sulfate. The sodium sulfate was removed by filtration, and the filtrate was evaporated to dryness under reduced pressure. The solid residue obtained upon evaporation to dryness of the filtrate was recrystallized from petroleum ether (B. P. 30° C.–60° C.), crystals being formed at −20° C. 1.8 grams of beta-diethylaminoethyl-9,12-diketo-10,11-octadecenoate having a melting point of 37° C. to 38° C. were obtained.

Calculated for $C_{24}H_{43}O_4N$: Carbon=70.37%; hydrogen=10.58%. Found: Carbon=70.67%; hydrogen=10.60%.

EXAMPLE V

*Beta - diethylaminopropyl - 9,12 - diketo - 10,11 - octadecenoate*

4.11 grams of isobutylchloroformate were added to a stirred solution of 9.3 grams of 9,12-diketo-10,11-octadecenoic acid and 3.06 grams of triethylamine in 30 ml. of tetrahydrofuran, the temperature during the addition being maintained at −5° C. to −10° C. After addition was complete, the reaction mixture was maintained at −5° C. to −10° C. and stirred for thirty minutes. A hot solution of 7.9 grams of beta-diethylaminopropanol and 3.06 grams of triethylamine in 10 ml. of tetrahydrofuran was added to the reaction mixture and the suspension which was formed was refluxed for thirty minutes. The precipitated triethylamine hydrochloride was removed by filtration and the filtrate was concentrated to dryness under reduced pressure. The oily residue obtained upon concentration to dryness was dissolved in 100 ml. of 3-normal-hydrochloric acid and the acid solution was allowed to fall through a 1-foot column containing 250 ml. of ether. The acidic solution was treated with animal charcoal, filtered, and neutralized at 0° C. with a ten percent aqueous solution of potassium hydroxide. The oily reaction product obtained upon neutralization was extracted with two 250 ml. portions of ether. The ether layers were combined, washed with water, and dried over sodium sulfate. The drying agent was removed by filtration and the ether was evaporated under reduced pressure. The residual oil was distilled at a pressure of 0.04 mm. of mercury. 3.8 grams of beta-diethylaminopropyl-9,12-diketo-10,11-octadecenoate having a B. P. of 230°–235° C. and a refractive index at 24° C. of 1.4685 were obtained.

Calculated for $C_{25}H_{45}O_4N$: Carbon=70.88%; hydrogen=10.71%. Found: Carbon=70.77%; hydrogen=10.80%.

EXAMPLE VI

*Beta-diethylaminoethyl-9,12-diketostearate*

1.7 grams of silver nitrate in solution in 3.4 ml. of water were added to a stirred solution of 3.12 grams of 9,12-diketostearic acid in 100 ml. of 95 percent ethanol containing 0.6 ml. of concentrated aqueous ammonium hydroxide solution. A precipitate formed immediately and the reaction mixture was allowed to stand for three hours and then warmed to 50° C. and filtered while warm. 2.3 grams of dried precipitate were obtained. The precipitate was suspended in 5 ml. of dry toluene and 0.75 gram of beta-chloroethyldiethylamine were added to the toluene solution. The solvent was removed under reduced pressure and the residue was dissolved in 100 ml. of 3-normal-hydrochloric acid. The acid solution was treated with animal charcoal and filtered. The filtrate was neutralized with a ten percent aqueous solution of potassium hydroxide. The oil which was formed upon neutralization was extracted with two 100 ml. portions of ether and the combined ether layers were washed with water and dried over sodium sulfate. The drying agent was removed by filtration and the solvent was removed under reduced pressure. The residue was recrystallized from petroleum ether (B. P. 30° to 60° C.), the crystals being formed at −20° C. 0.4 gram of beta-diethylaminoethyl-9,12-diketostearate having a melting point of 30°–31° C. were obtained.

Calculated for $C_{24}H_{45}O_4N$: Carbon=70.03%; hydrogen=11.02%. Found: Carbon=70.34%; hydrogen=10.81%.

The novel compounds of this invention are highly effective at low concentration in killing microorganisms or preventing or inhibiting their growth.

EXAMPLE VII

The compounds prepared according to the above examples were tested for bactericidal activity by the following serial dilution method.

The compounds were sterilized by exposure to propylene oxide for three days and 0.5 milliliter of sterile aqueous solution containing twenty micrograms of compound per milliliter of solution was added to 9.5 milliliters of sterile yeast beef broth, the broth then being serially diluted with additional sterile broth, to provide solutions of five milliliters total volume containing 500, 200, 100, 50, 10, 1, 0.1, and 0.01 micrograms of compound per milliliter of solution. Five tubes, each containing 4.5 milliliters of sterile broth, were inoculated with 0.1 milliliter of a mature broth culture of *Bacillus subtilis, Diplococcus pneumoniae III, Escherichia coli, Micrococcus pyogenes* var. *aureus*, and *Proteus vulgaris*, respectively, and the inoculated tubes were incubated at 37° C. for 24 hours. Five tubes, each containing 4.5 milliliters of sterile broth, were each inoculated with 0.1 milliliter of an incubated culture and incubated at 37° C. for 24 hours. Progressive series of dilutions ranging from 1 to 100, to 1 to 1 billion, were prepared by dilution of the contents of the five tubes with sterile broth and 0.1 milliliter of each dilution was transferred into 4.5 milliliters of sterile broth and incubated at 37° C. for 24 hours. 0.1 milliliter of the contents of the tubes representing the highest dilution which initiated growth of the organisms were each transferred into each of the tubes containing the compounds to be tested and this was followed by incubation of the tubes at 37° C. for 48 hours. All of the compounds tested inhibited growth. Beta-diethylaminoethyl - 9,12 - diketo-10,11-octadecenoate inhibited the growth of the organisms listed above at concentrations of 10, 500, 500, 50, and 500 micrograms per milliliter, respectively.

The compounds prepared according to the foregoing examples were tested for activity against Mycobacteria tuberculosis H37Rv according to the method of A. W' Frisch and M. S. Tarshis American Review of Tuberculosis, vol. 64, page 551 (1951); all of the compounds tested inhibited growth. Beta-dimethylaminoethyl-9,12-diketostearate inhibited growth at a concentration of one hundred micrograms per milliliter.

The compounds prepared according to the foregoing examples were tested for activity against *Coccidioides immitis* by a serial dilution method given by the following procedure:

The compounds were sterilized by exposure to propylene oxide for three days and 0.25 milliliter of sterile aqueous solution containing twenty micrograms of compound per milliliter of solution was added to 4.5 milliliters of sterile Mycophil broth, the broth then being serially diluted with additional sterile broth to provide solutions of five milliliters total volume containing 500, 100, 10, 1, 0.1, and 0.01 micrograms of compound per milliliter of solution. One milliliter of a seventy-two hour Mycophil broth culture of *Coccidioides immitis* was added to ninety-nine milliliters of sterile Mycophil broth and 0.2 milliliter of diluted culture was added to each of the serial dilutions containing the test compound and the inoculated tubes were incubated at 25° C. for five days. All of the compounds inhibited growth of *Coccidioides immitis;* the concentrations at which beta-diethylaminoethyl-9,12-diketo-10,11-octadecenoate inhibited growth, being 100 micrograms per milliliter.

What is claimed is:

1. New and useful compounds having the formula:

$$C_6H_{13}-\overset{\overset{O}{\|}}{C}-Z-\overset{\overset{O}{\|}}{C}-(CH_2)_7-\overset{\overset{O}{\|}}{C}-O-X-N\begin{matrix}\diagup R\\ \diagdown R_1\end{matrix}$$

in which X is a lower alkylene radical, R and $R_1$ are each a lower alkyl radical and Z is a radical selected from the class consisting of ethylene, vinylene and epoxyethylene radicals.

2. New and useful compounds according to claim 1 in which X is a lower alkylene radical having at least two but not more than three carbon atoms and R and $R_1$ are each an alkyl radical having not more than two carbon atoms.

3. Beta-dimethylaminoethyl - 9,12 - diketo-10,11-epoxystearate.

4. Beta-dimethylaminoethyl-9,12-diketostearate.

5. Beta - diethylaminoethyl - 9,12 - diketo - 10,11 - octadecenoate.

6. Beta - diethylaminopropyl - 9,12 - diketo-10,11-octadecenoate.

7. Beta-diethylaminoethyl-9,12-diketostearate.

References Cited in the file of this patent

UNITED STATES PATENTS

| | | |
|---|---|---|
| 2,430,004 | De Groote | Nov. 4, 1947 |
| 2,623,889 | Nichols | Dec. 30, 1952 |

OTHER REFERENCES

Emery et al.: J. Chem. Soc. (1950), pages 1443–1460.

Vaughn, Jr.: J. Am. Chem. Soc., vol. 73 (1951), page 3547.